United States Patent
Kato

(10) Patent No.: US 10,155,288 B2
(45) Date of Patent: Dec. 18, 2018

(54) LASER MACHINING APPARATUS

(71) Applicant: HONDA MOTOR CO., LTD., Tokyo (JP)

(72) Inventor: Daisuke Kato, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/014,123

(22) Filed: Feb. 3, 2016

(65) Prior Publication Data
US 2016/0151863 A1 Jun. 2, 2016

Related U.S. Application Data

(62) Division of application No. 14/188,787, filed on Feb. 25, 2014, now Pat. No. 9,278,408.

(30) Foreign Application Priority Data

Feb. 27, 2013 (JP) ................. 2013-037231

(51) Int. Cl.
*B23K 26/384* (2014.01)
*B23K 26/388* (2014.01)
(Continued)

(52) U.S. Cl.
CPC .......... *B23K 26/384* (2015.10); *B23K 26/142* (2015.10); *B23K 26/16* (2013.01);
(Continued)

(58) Field of Classification Search
CPC .. B23K 26/16; B23K 26/089; B23K 26/1405; B23K 26/14; B23K 26/1458; B23K 26/1488; B23K 26/381; B23K 26/0092
(Continued)

(56) References Cited

U.S. PATENT DOCUMENTS 4,288,678 A * 9/1981 La Rocca .......... B23K 26/0643
219/121.65
5,173,583 A * 12/1992 de Contencin ........ B23K 26/06
219/121.74
(Continued)

FOREIGN PATENT DOCUMENTS

DE 4403999 A1 8/1995
JP 04-127987 4/1992
(Continued)

OTHER PUBLICATIONS

Japanese Office Action with partial English Translation dated Oct. 4, 2016, 6 pages.

*Primary Examiner* — Tu B Hoang
*Assistant Examiner* — Alba Rosario-Aponte
(74) *Attorney, Agent, or Firm* — Rankin, Hill & Clark LLP

(57) ABSTRACT

A laser machining apparatus includes a laser nozzle for supplying an assistive gas to remove undesirable materials and applying a laser beam at an angle, which is inclined with respect to a surface of a workpiece, a sputter blocking jig disposed over a region of the workpiece that is irradiated with the laser beam, so as to lie across directions in which the laser beam is scattered, and for blocking sputtered particles that are generated from the surface by the applied laser beam, and a joint connecting the laser nozzle and the sputter blocking jig to each other. The joint moves the laser nozzle and the sputter blocking jig in synchronism with each other.

11 Claims, 9 Drawing Sheets

(51) Int. Cl.
*B23K 26/16* (2006.01)
*B23K 26/70* (2014.01)
*B23K 26/142* (2014.01)
*B23K 26/382* (2014.01)
*B23K 101/00* (2006.01)

(52) U.S. Cl.
CPC .......... *B23K 26/382* (2015.10); *B23K 26/388* (2013.01); *B23K 26/389* (2015.10); *B23K 26/702* (2015.10); *B23K 2101/001* (2018.08)

(58) Field of Classification Search
USPC ............................ 219/121.7, 121.72, 121.84
See application file for complete search history.

(56) References Cited

U.S. PATENT DOCUMENTS

| | | | |
|---|---|---|---|
| 5,609,779 A | 3/1997 | Crow et al. | |
| 5,662,762 A * | 9/1997 | Ranalli | B08B 7/0042 156/707 |
| 6,204,475 B1 * | 3/2001 | Nakata | B23K 26/147 219/121.84 |
| 6,492,617 B2 * | 12/2002 | Nagahori | B23K 26/1494 219/121.7 |
| 6,573,474 B1 | 6/2003 | Loringer | |
| 9,003,936 B2 * | 4/2015 | Chillman | B24C 1/045 83/168 |
| 2002/0134770 A1 * | 9/2002 | Freiwald | B08B 7/0042 219/121.68 |
| 2003/0121896 A1 * | 7/2003 | Yu | B08B 7/0042 219/121.68 |
| 2003/0201087 A1 | 10/2003 | Devine et al. | |
| 2008/0223835 A1 | 9/2008 | Kuhn et al. | |
| 2009/0151996 A1 | 6/2009 | Mishima et al. | |
| 2009/0169394 A1 | 7/2009 | Crow et al. | |
| 2009/0242521 A1 | 10/2009 | Alpay et al. | |
| 2012/0051941 A1 | 3/2012 | Bunder | |
| 2012/0102959 A1 | 5/2012 | Starkweather | |

FOREIGN PATENT DOCUMENTS

| | | |
|---|---|---|
| JP | 04127987 A * | 4/1992 |
| JP | 10225784 A | 8/1998 |
| JP | 11314189 A | 11/1999 |
| JP | 2004-3470 | 1/2004 |
| JP | 2004-511350 | 4/2004 |
| JP | 3719466 | 9/2005 |
| JP | 2008-068316 | 3/2008 |
| JP | 2008-284572 | 11/2008 |
| JP | 2009-162224 | 7/2009 |
| JP | 2010-201452 | 9/2010 |
| JP | 2010-207851 | 9/2010 |
| JP | 2011-516267 | 5/2011 |
| JP | 2012-52535 | 3/2012 |

* cited by examiner

LASER MACHINING APPARATUS

CROSS-REFERENCE TO RELATED APPLICATION

This application is based upon and claims the benefit of priority from Japanese Patent Application No. 2013-037231 filed on Feb. 27, 2013, the contents of which are incorporated herein by reference.

BACKGROUND OF THE INVENTION

Field of the Invention

The present invention relates to a laser machining apparatus, which applies a laser beam at an angle that is set to be inclined with respect to the surface of a workpiece, in order to form oblique holes in the surface of the workpiece.

Description of the Related Art

Aircraft engines, e.g., gas turbine engines, burn fuel in a combustor by injecting the fuel into the combustor while at the same time sending combustion air, which is compressed by a rotary compressor, into the combustor. During burning of the fuel, the combustor produces a high-temperature combustion gas under high pressure, and delivers the combustion gas in order to rotate a centrifugal or axial-flow gas turbine.

Since the combustor burns fuel and generates high-temperature combustion gas, the combustor is exposed to a considerably high-temperature environment. The gas turbine has turbine blades, which also are exposed to the high-temperature environment. U.S. Patent Application Publication 2008/0223835 A1 (hereinafter referred to as "Prior Art Document 1") and U.S. Patent Application Publication 2012/0051941 A1 (hereinafter referred to as "Prior Art Document 2") disclose cooling holes formed obliquely in the surface of the combustor for introducing secondary air into the combustor, so as to bring about a cooling effect that lowers the temperature of the combustor surface.

According to Prior Art Document 1 and Prior Art Document 2, a laser beam is applied to a machining surface of the combustor in order to form oblique holes, which function as cooling holes. When the laser beam is applied to the machining surface of the combustor, the laser beam is reflected by the machining surface, which tends to cause sputtering. Consequently, molten metal scum (hereinafter referred to as "dross") frequently is produced by the laser beam and becomes deposited on a machining surface that is machined subsequently. Such dross is liable to lower the accuracy with which the laser beam machines the machining surface, and to increase the period of time required to machine the machining surface.

Occasionally, a practice is carried out to set the angle at which the laser beam is applied to the machining surface to a considerably small value, to thereby elongate the oblique holes that serve as cooling holes. If the angle at which the laser beam is applied to the machining surface is of a small value, then the wall thickness of the workpiece, which is machined by the laser beam, increases, thereby increasing the period of time required to machine the workpiece with the laser beam and resulting in a tendency to produce even more dross.

According to one solution, as disclosed in U.S. Patent Application Publication 2009/0151996 A1 (hereinafter referred to as "Prior Art Document 3"), a sacrificial layer is provided on the surface of a workpiece, so as to control the tapered shape of a hole to be formed in the workpiece, and to prevent burrs from being formed as well as to prevent sputtered particles from becoming deposited on the workpiece.

SUMMARY OF THE INVENTION

According to Prior Art Document 3, however, the sacrificial layer must be removed after the workpiece has been machined by the laser beam. Therefore, the number of laser machining steps increases, and a high-quality laser machining process cannot be performed efficiently.

It is an object of the present invention to provide a laser machining apparatus, which has a simple structure and is capable of minimizing machining failures caused by sputtering. In addition, the laser machining apparatus is capable of efficiently forming a plurality of high-quality oblique holes in a workpiece.

The present invention relates to a laser machining apparatus, which applies a laser beam to a workpiece at an angle that is set to be inclined with respect to a surface of the workpiece, to thereby form an oblique hole in the surface.

The laser machining apparatus according to the present invention comprises a laser nozzle, a sputter blocking jig, and a joint. The laser nozzle supplies an assistive gas to remove undesirable material produced by the applied laser beam, and applies the laser beam at the set angle with respect to the surface of the workpiece, either in a pulsed pattern or continuously for a predetermined period of time. The sputter blocking jig is disposed over a region of the workpiece that is irradiated with the laser beam, so as to lie across directions in which the laser beam is scattered, and for blocking sputtered particles that are generated from the surface by the applied laser beam. The joint interconnects the laser nozzle and the sputter blocking jig to each other. The joint moves the laser nozzle and the sputter blocking jig in synchronism with each other.

Since the laser nozzle and the sputter blocking jig are moved in synchronism with each other, dross produced from the sputtered particles is reliably prevented from becoming deposited on a region of the workpiece that is machined subsequently. Further, the laser machining apparatus is capable of shortening the time required to form holes in the surface of the workpiece and of suitably machining the workpiece.

Thus, the laser machining apparatus according to the present invention is capable of minimizing machining failures caused by sputtering, with a simple structure. In addition, the laser machining apparatus is capable of efficiently forming a plurality of high-quality oblique holes in a workpiece.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
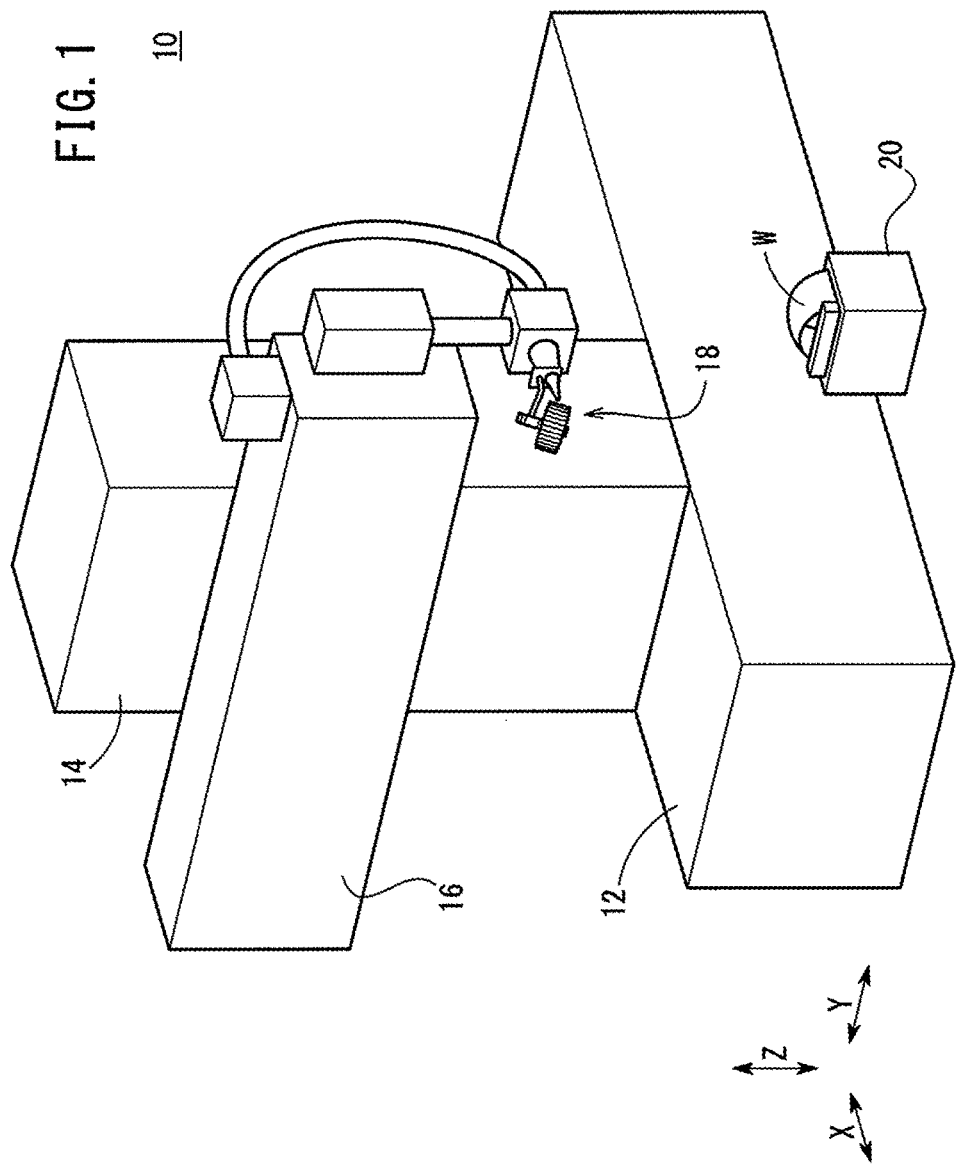
FIG. 1 is a perspective view of a laser machining apparatus according to a first embodiment of the present invention.

As shown in FIG. 1, a laser machining apparatus 10 according to a first embodiment of the present invention has a base 12 extending along an X-axis direction, i.e., along left and right directions. The base 12 supports thereon an X-axis table 14 movable along the X-axis direction, and the X-axis table 14 supports thereon a Y-axis table 16 movable along a Y-axis direction, i.e., along forward and rearward directions perpendicular to the X-axis direction.

The laser machining apparatus 10 also includes a machining head 18 mounted on the Y-axis table 16 for movement along a Z-axis direction, i.e., upward and downward directions perpendicular to the X-axis direction and the Y-axis direction. The machining head 18 is movable about two axes, i.e., rotatable about a C-axis and tiltable about an A-axis.

Consequently, the laser machining apparatus 10 is a five-axis laser machining apparatus operable along the X-axis, the Y-axis, and the Z-axis, as well as about the C-axis and the A-axis. However, the present invention is not limited to five-axis laser machining. A workpiece W, which typically is a combustor, is placed on a rotary table 20, which is movable about two axes, i.e., rotatable about an axis and tiltable about another axis. Therefore, the laser machining apparatus 10 and the rotary table 20 are capable of jointly performing seven-axis laser machining.

Figure 2:
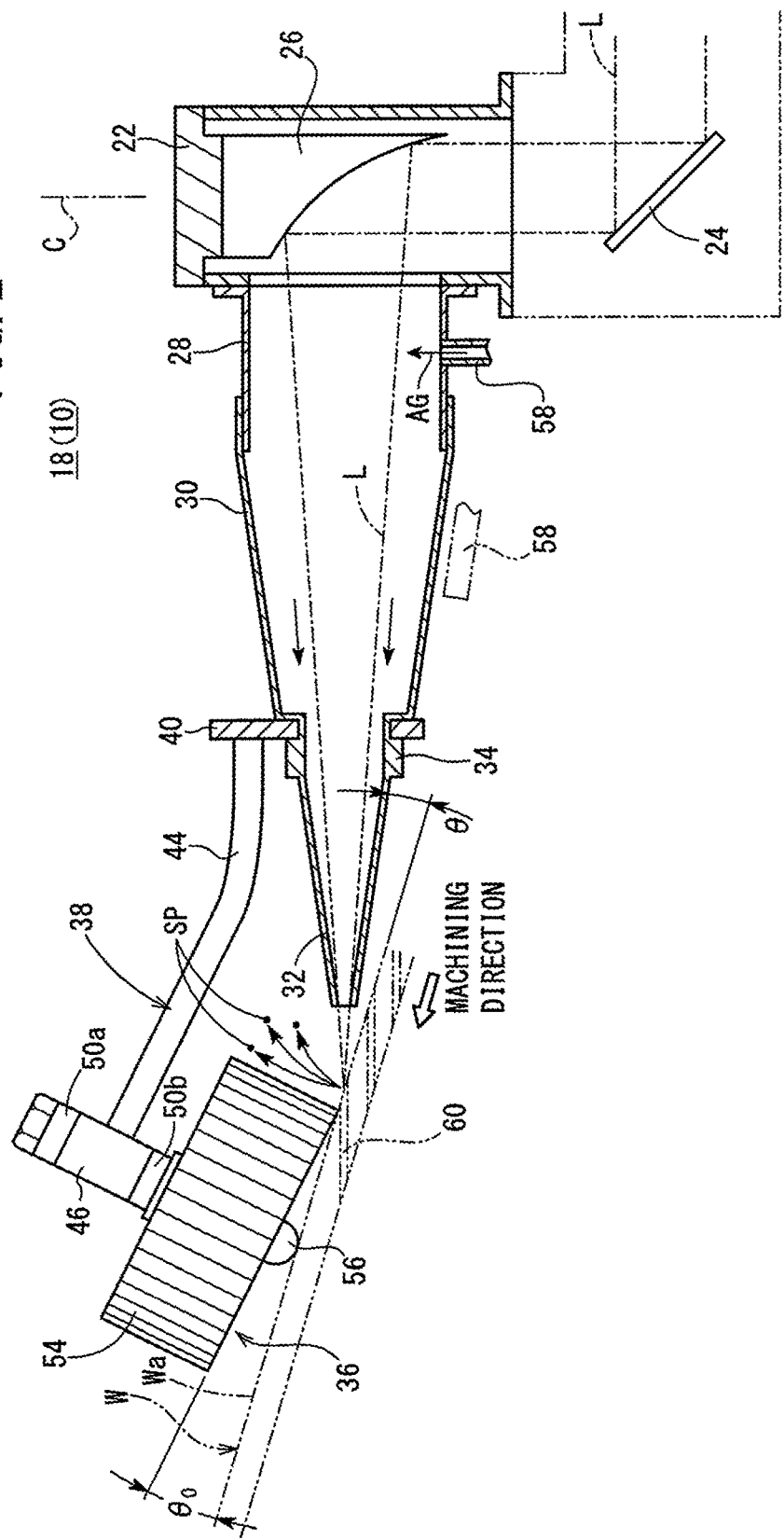
FIG. 2 is a cross-sectional view of a central portion of a machining head of the laser machining apparatus shown in FIG. 1.

The laser machining apparatus 10 preferably has a fiber laser oscillator (not shown) or a YAG laser oscillator (not shown). As shown in FIG. 2, the machining head 18 includes a housing 22, which houses therein a light collecting optical system 26 that collects a laser beam L emitted from the fiber laser oscillator or the YAG laser oscillator, and which is guided by a reflecting mirror 24, etc.

A sleeve 28 is mounted on a side wall of the housing 22. The laser beam L, which is collected by the light collecting optical system 26, is emitted from the sleeve 28. The sleeve 28 supports thereon a tapered laser nozzle 30 having a nozzle tip 32 on a distal end thereof, with a flange 34 disposed on the nozzle tip 32 near a proximal end that is joined to the sleeve 28.

A sputter blocking jig 36 is mounted on the nozzle tip 32 by a joint 38 for synchronous movement in unison with the nozzle tip 32. The sputter blocking jig 36, which is mounted on the nozzle tip 32, is positioned over a region (machined region) of the workpiece W that is irradiated with the laser beam L, so as to lie across directions in which the laser beam L is scattered. The sputter blocking jig 36 serves to block sputter SP, which is emitted from a surface Wa of the workpiece W that is irradiated with the laser beam L.

Figure 3:
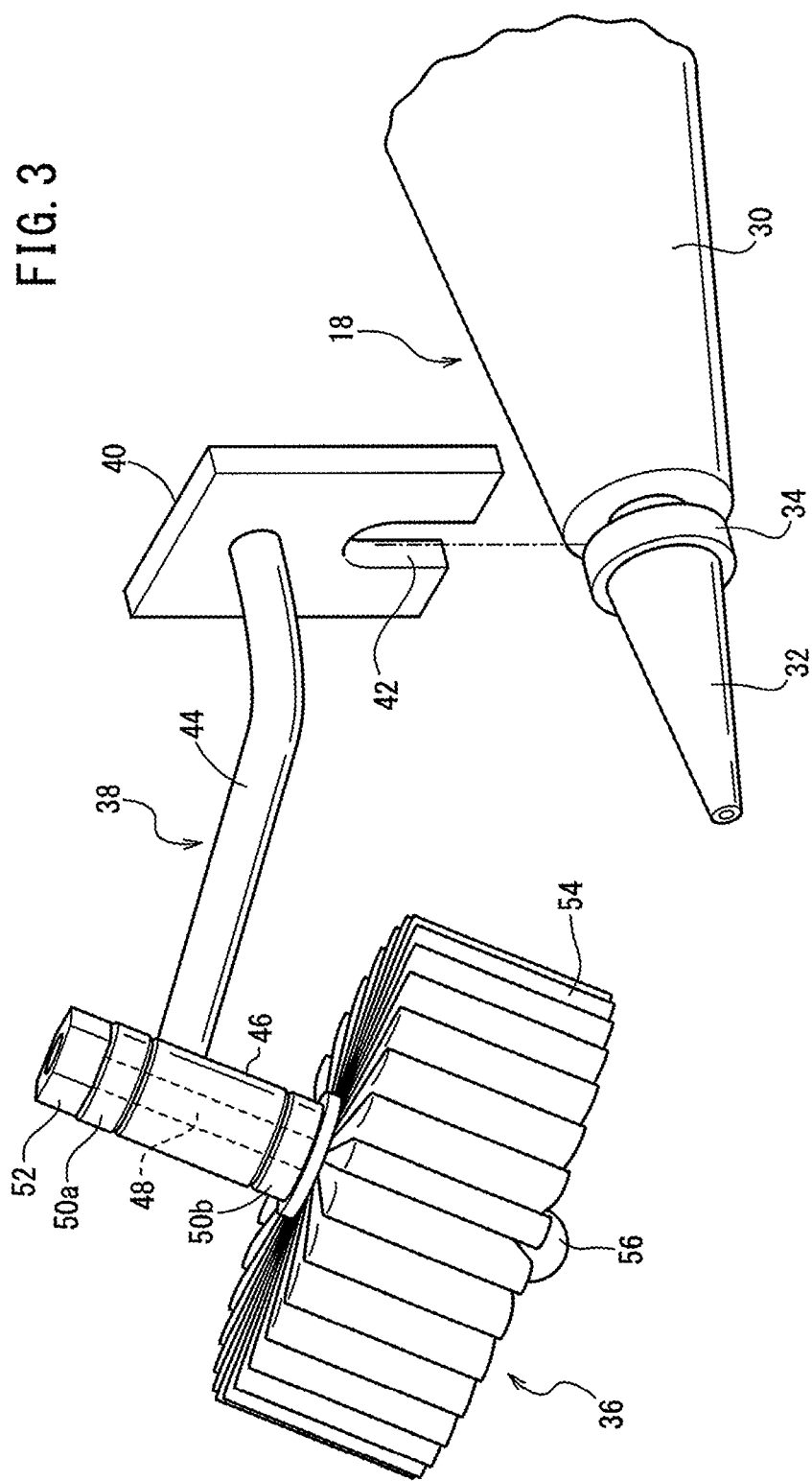
FIG. 3 is an exploded perspective view of the machining head.
Figure 4:
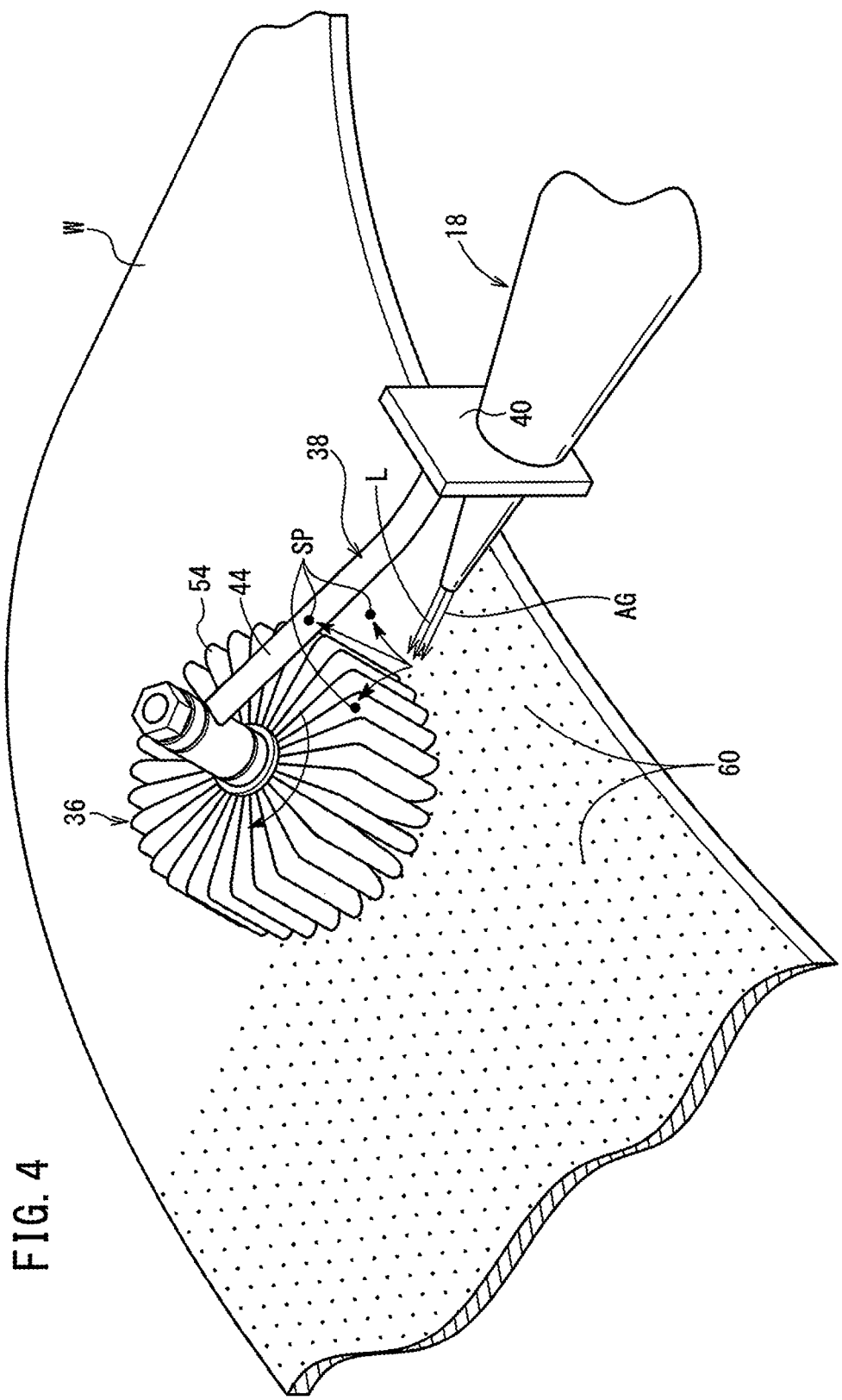
FIG. 4 is a perspective view showing a manner in which the machining head operates.

As shown in FIGS. 2 and 3, the joint 38 includes a plate-like bracket 40 having a substantially semicircular recess 42 defined in one end thereof. The bracket 40 is detachably mounted on the nozzle tip 32, with the recess 42 receiving the outer circumferential surface of the nozzle tip 32 at the proximal end thereof, i.e., the proximal end of the nozzle tip 32 between the flange 34 and the distal end of the laser nozzle 30. The joint 38 also includes a joint bar 44 having one end fixed to the bracket 40. The joint bar 44 has a predetermined length and is bent at a predetermined angle. A cylindrical tube 46 is mounted on the other end of the joint bar 44.

A shaft 48 of the sputter blocking jig 36 is inserted in the cylindrical tube 46. The shaft 48 is rotatably supported in the cylindrical tube 46 by a pair of bearings 50a, 50b on respective axially opposite ends of the cylindrical tube 46. A nut 52 is threaded over one end of the shaft 48, whereas a wheel having a plurality of vanes 54 is fixedly mounted on the other end of the shaft 48 for rotation in unison therewith.

The vanes 54, each of which is of a rectangular shape, are disposed radially around the shaft 48 so as to provide a brush structure. The vanes 54 are made of a heat-resistant material, such as ceramic paper or the like, in the form of a thin film. Alternatively, the vanes 54 may be coated with a heat-resistant paint such as boron nitride or the like, for example.

As shown in FIG. 2, a ball plunger 56 is mounted on the other end of the shaft 48. The ball plunger 56 is held in contact with the surface Wa of the workpiece W while keeping the vanes 54 and the surface Wa inclined at a predetermined angle $\theta_0$. Among the vanes 54, those that are positioned closer to the nozzle tip 32 preferably are kept in contact with the surface Wa of the workpiece W. The nozzle tip 32 is set to be inclined with respect to the surface Wa at an angle $\theta$ in a range of 10° to 90°, and more preferably, in a range of 10° to 40°.

An assistive gas inlet pipe 58 is connected integrally to the sleeve 28. Alternatively, the assistive gas inlet pipe 58 may be separably or movably connected in synchronism with the sleeve 28. The assistive gas inlet pipe 58 introduces an assistive gas AG into the sleeve 28. The assistive gas AG flows through the laser nozzle 30 and is ejected from the nozzle tip 32 to a machined region of the workpiece W, so as to blow away undesirable material including dross and scattered gas, etc., which are produced when the workpiece W is machined by the laser beam L. The sputter blocking jig 36 is disposed in a position where the vanes 54 are rotatable by the assistive gas AG and between a region of the workpiece W that is currently being machined and a region of the workpiece W to be machined subsequently.

Operations of the laser machining apparatus 10 will be described below.

The non-illustrated fiber laser oscillator emits a fiber laser beam having a wavelength in a 1070 nm band. Alternatively, the non-illustrated YAG laser oscillator emits a YAG laser beam having a wavelength in a 1064 nm band. The laser beam, which is emitted from the fiber laser oscillator or the YAG laser oscillator, has a peak output level of about 20 kW, a frequency in a range from about 5 Hz to about 100 Hz, and a pulse duration in a range from about 0.1 ms to 9 ms.

As shown in FIG. 2, the machining head 18 has the nozzle tip 32, which is set to be inclined at an angle $\theta$ with respect to the machined region of the workpiece W, i.e., the surface Wa of the workpiece W. The machining head 18 also includes the sputter blocking jig 36, which is disposed between the region of the workpiece W that is currently being machined and the region of the workpiece W to be machined subsequently.

The fiber laser oscillator or the YAG laser oscillator is energized to apply the laser beam L from the nozzle tip 32 to the surface Wa of the workpiece W. At the same time, the assistive gas AG is introduced from the assistive gas inlet pipe 58 into the machining head 18, and is ejected from the nozzle tip 32 toward the machined region of the workpiece W, either in a pulsed pattern or continuously for a given period of time. The applied laser beam L forms an oblique cooling hole 60 in the surface Wa of the workpiece W. While the cooling hole 60 is being formed in the surface Wa, sputtered particles SP are produced from the surface Wa. There is a tendency for the sputtered particles SP to become deposited as dross on the surface Wa.

According to the first embodiment, the sputter blocking jig 36 is mounted on the nozzle tip 32 by the joint 38. The sputter blocking jig 36 includes the shaft 48, which is mounted rotatably on the joint 38 by the bearings 50a, 50b, so that the vanes 54, which are fixed to the shaft 48, are rotatable with respect to the joint 38.

When the assistive gas AG, which is ejected from the nozzle tip 32, is applied to the vanes 54, the vanes 54 are rotated about the axis of the shaft 48. Sputtered particles SP that are produced from the surface Wa by the applied laser beam L are forcibly scattered away by the rotating vanes 54, thereby reliably preventing dross from becoming deposited on the surface Wa around the cooling hole 60.

Since the sputter blocking jig 36 is disposed between the region of the workpiece W that is currently being machined and the region of the workpiece W to be machined subsequently, the sputter blocking jig 36 is effective to prevent dross from becoming deposited on a subsequently machined region of the workpiece W.

After the cooling hole 60 has been formed, the machining head 18 moves to another region of the workpiece W, which is to be machined next, and the laser beam M is applied to the next region of the workpiece W. A cooling hole 60 is formed as a next inclined hole in the surface Wa of the subsequently machined region. Further, during this time, the vanes 54 are rotated by the applied assistive gas AG so as to scatter away sputtered particles SP.

The machining head 18 may be moved intermittently to successive regions of the workpiece W for thereby laser-machining the regions. Alternatively, the machining head 18 may be moved continuously to successive regions of the workpiece W without stopping laser-machining of such regions, in a so-called on-the-fly machining process.

According to the first embodiment, as described above, since the laser nozzle 30 and the sputter blocking jig 36 are interconnected by the joint 38, the laser nozzle 30 and the sputter blocking jig 36 move in synchronism with each other. Consequently, the sputtered particles SP, which are scattered by the applied laser beam L, are reliably prevented from becoming deposited as dross on a subsequently machined region of the workpiece W.

Accordingly, the laser machining apparatus 10 is capable of shortening the time required to form cooling holes 60 in the surface Wa of the workpiece W, and of suitably machining the workpiece W. Thus, the laser machining apparatus 10 is capable of minimizing machining failures caused by sputtered particles SP, and of forming a plurality of oblique holes, i.e., cooling holes 60, efficiently and with high quality in the workpiece W.

The sputter blocking jig 36 is disposed between the currently machined region of the workpiece W and a subsequently machined region of the workpiece W. Consequently, the sputter blocking jig 36 is capable of preventing dross from becoming deposited on the subsequently machined region, of preventing the workpiece W from increasing in thickness during the laser machining process, and of effectively shortening the time required to machine the workpiece W with the laser beam L.

The vanes 54 of the sputter blocking jig 36 are made of a heat-resistant material or are coated with a heat-resistant paint. Consequently, the sputter blocking jig 36 is prevented from suffering seizures due to application of the laser beam L.

The shaft 48 is provided with the ball plunger 56, which is held in contact with the surface Wa of the workpiece W. The ball plunger 56 keeps the vanes 54 a certain distance from the surface Wa of the workpiece W, so that the vanes 54 can effectively and reliably scatter the sputtered particles SP.

The angle $\theta$ at which the nozzle tip 32 is inclined with respect to the surface Wa is set in a range of 10° to 90°. If the angle $\theta$ is smaller than 10°, then the distance by which the workpiece W is machined, i.e., the thickness of the workpiece W, is too large for holes to be formed in the surface Wa with the laser beam L. If the angle $\theta$ is close to 90°, then the cooling holes 60, which are formed by the laser beam L, tend to be short.

If the angle $\theta$ is smaller than 40°, then the cooling holes 60 are sufficiently long to achieve a desired cooling capability. Preferably, therefore, the angle $\theta$ at which the nozzle tip 32 is inclined with respect to the surface Wa is set in the range of 10° to 40°.

Figure 5:
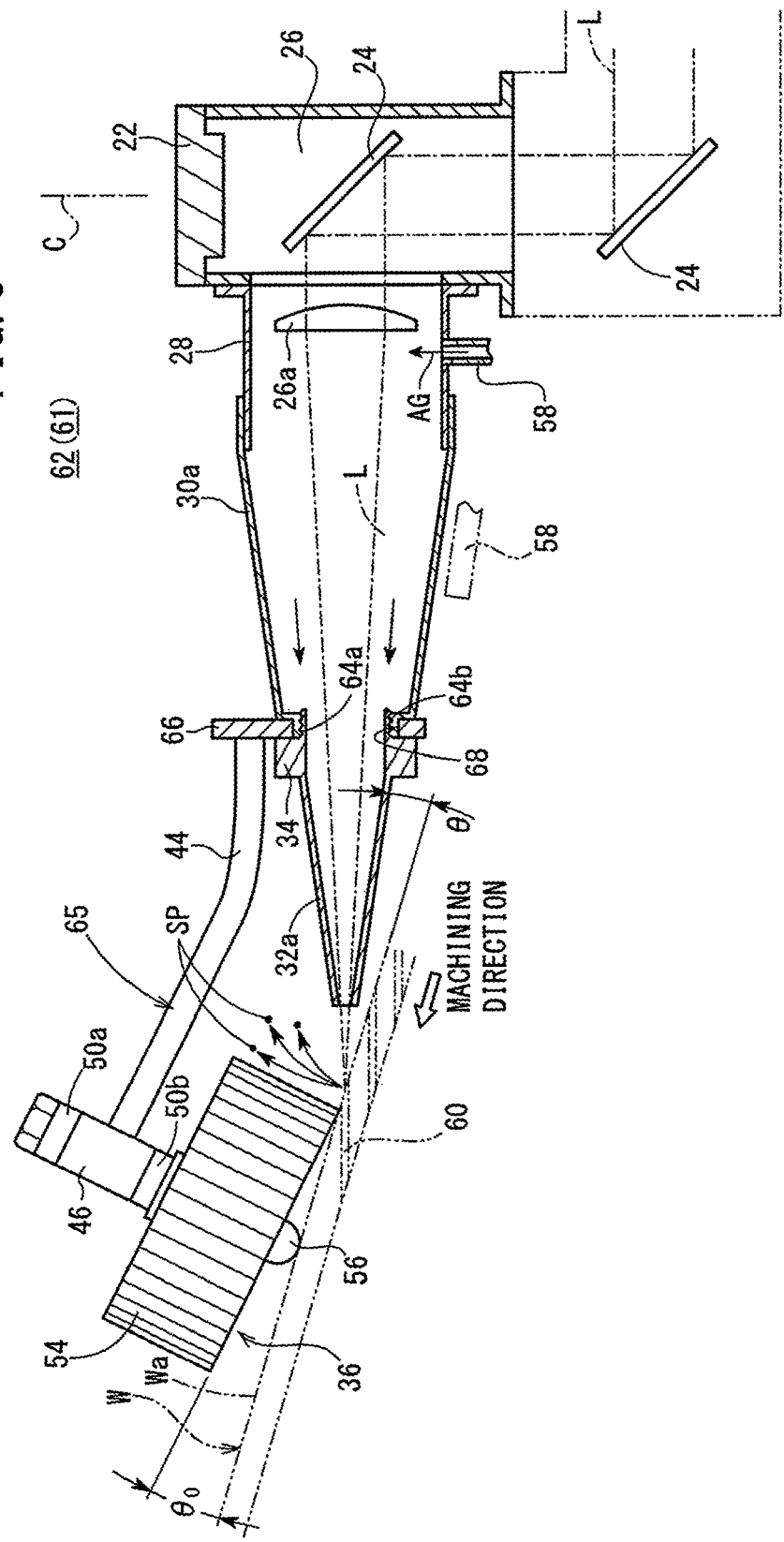
FIG. 5 is a cross-sectional view of a laser machining apparatus according to a second embodiment of the present invention.
Figure 6:
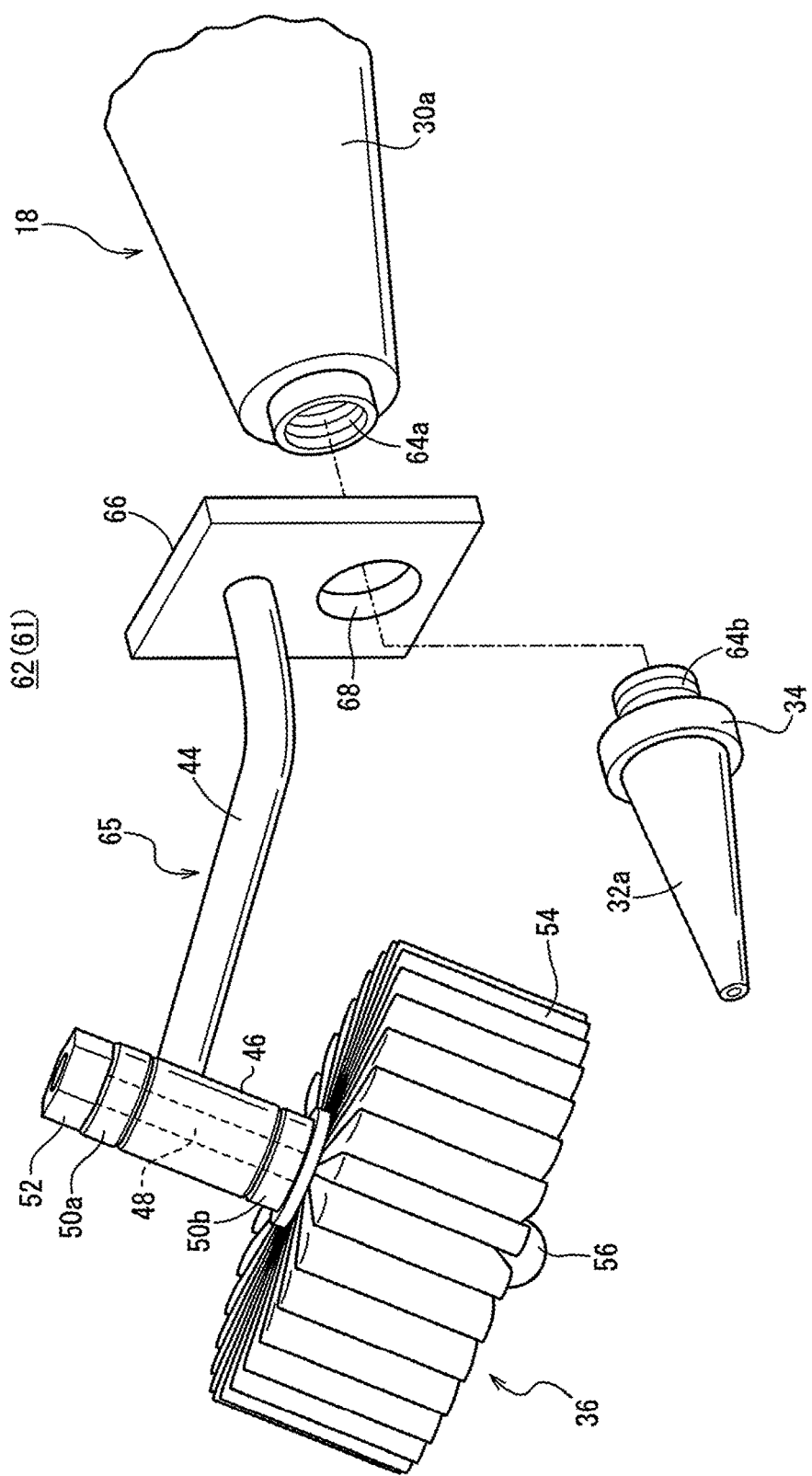
FIG. 6 is an exploded perspective view of a central portion of a machining head of the laser machining apparatus shown in FIG. 5.

As shown in FIGS. 5 and 6, a laser machining apparatus 61 according to a second embodiment of the present invention includes a machining head 62. The machining head 62 includes the housing 22, which houses reflecting mirrors 24 therein, and the sleeve 28, which houses a machining lens 26a that serves as a light collecting optical system.

Components of the laser machining apparatus 61 according to the second embodiment, which are identical to those of the laser machining apparatus 10 according to the first embodiment, are denoted by identical reference characters, and such features will not be described in detail below. The same holds true for a laser machining apparatus according to a third embodiment of the present invention, to be described later.

The machining head 62 includes a laser nozzle 30a and a nozzle tip 32a, which is mounted on the laser nozzle 30a. The laser nozzle 30a has an internally threaded hole 64a defined by an inner circumferential surface of a distal end of the laser nozzle 30a. The nozzle tip 32a, which is mounted on the distal end of the laser nozzle 30a, has an externally threaded knob 64b on a proximal end thereof. The externally threaded knob 64b is threaded in the internally threaded hole 64a. The sputter blocking jig 36 is mounted through a joint 65 on the distal end of the laser nozzle 30a.

The joint 65 includes a plate-like bracket 66 having a hole 68 defined therein. The sputter blocking jig 36 is installed on the laser nozzle 30a and the nozzle tip 32a in the following manner. The distal end of the laser nozzle 30a is inserted into the hole 68, and thereafter, the nozzle tip 32a is threaded into the laser nozzle 30a. More specifically, the externally threaded knob 64b of the nozzle tip 32a is threaded into the internally threaded hole 64a in the laser nozzle 30a, thereby fastening the nozzle tip 32a and the laser nozzle 30a to each other with the bracket 66 clamped therebetween.

According to the second embodiment, the nozzle tip 32a is replaceably mounted on the laser nozzle 30a by the internally threaded hole 64a and the externally threaded knob 64b. A nozzle tip 32a having a different shape may be installed on the laser nozzle 30a, so that the assistive gas flows at a different rate and is ejected at a different speed. Accordingly, the machining head 62 can be adapted to conform to shapes of different workpieces W, and the laser machining conditions can easily be adjusted. Thus, in addition to offering the same advantages as those of the first embodiment, the laser machining apparatus 61 according to the second embodiment is economically more versatile.

Figure 7:
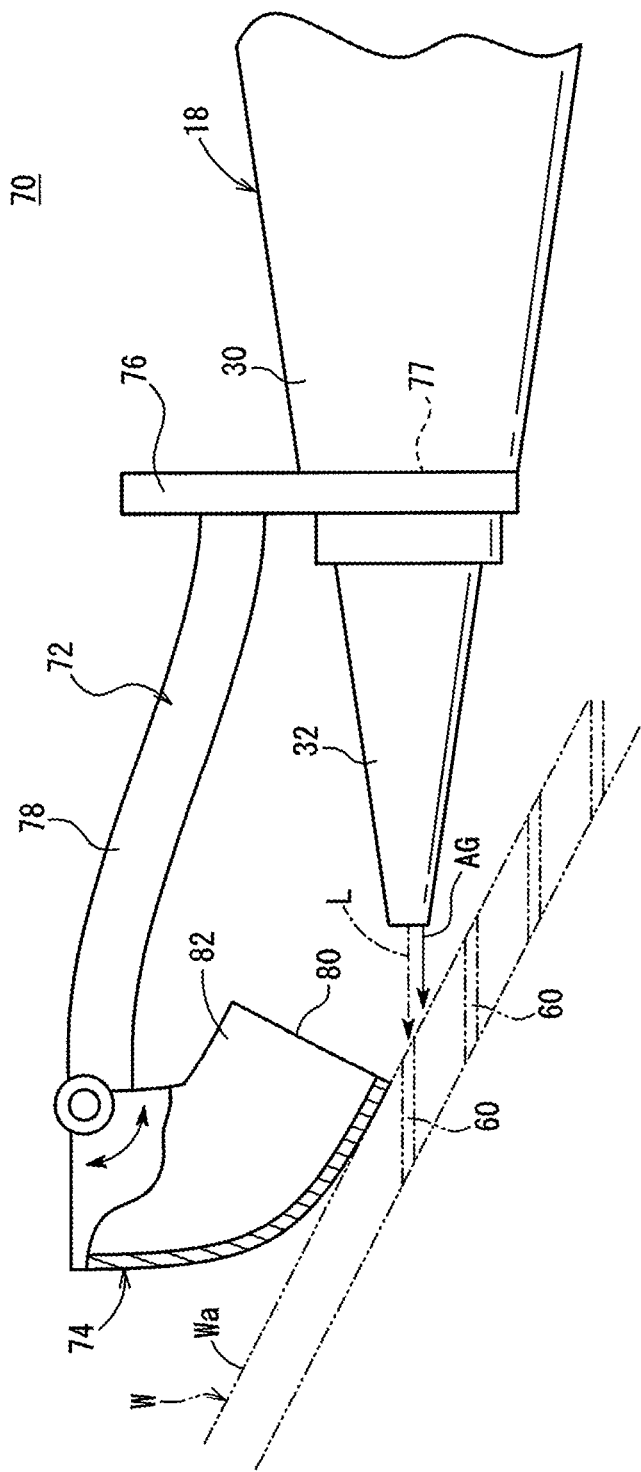
FIG. 7 is an elevational view of a central portion of a laser machining apparatus according to a third embodiment of the present invention.
Figure 8:
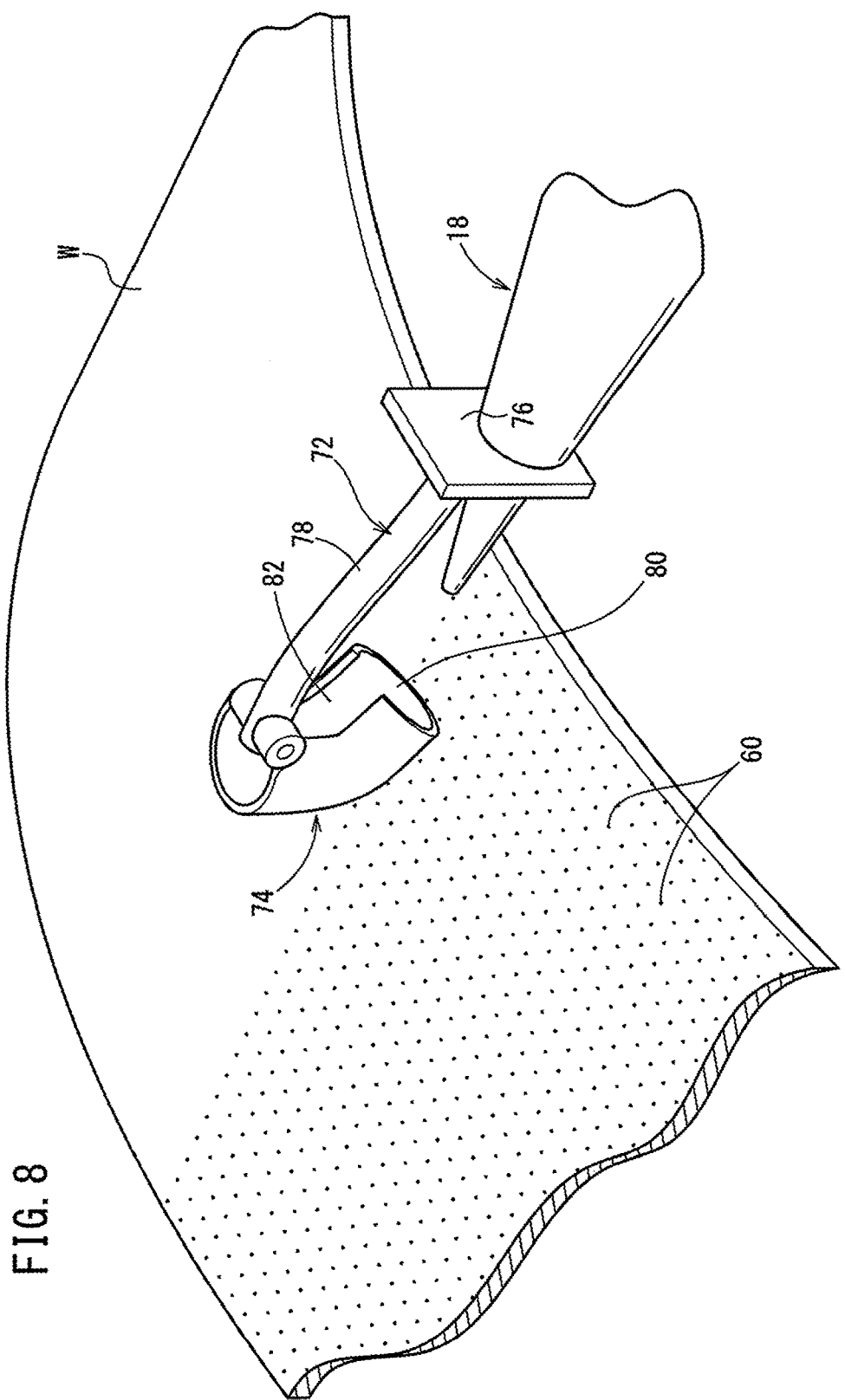
FIG. 8 is a perspective view of the central portion of the laser machining apparatus shown in FIG. 7.

As shown in FIGS. 7 and 8, a laser machining apparatus 70 according to a third embodiment of the present invention includes a sputter blocking jig 74, which is mounted on the distal end of a machining head 18 by a joint 72.

The joint 72 includes a bracket 76 having a hole 77 defined therein. The bracket 76 is fixed to the laser nozzle 30 in the following manner. The bracket 76 is placed on the distal end of the laser nozzle 30, and thereafter, the nozzle tip 32 is mounted on the distal end of the laser nozzle 30, thereby fixing the bracket 76 to the laser nozzle 30. The distal end of the laser nozzle 30 and the nozzle tip 32 may be fixed to each other integrally, or may be detachably coupled to each other by way of threaded engagement, similar to the case of the second embodiment.

The joint 72 includes a joint bar 78 having one end fixed to the bracket 76, and another end on which a sputter blocking jig 74 is swingably mounted or is mounted integrally therewith.

The sputter blocking jig 74 has a blocking body 80, which is substantially in the form of a hollow cylinder having an opening 82 defined in a side wall thereof that confronts the laser nozzle 30. The blocking body 80 is substantially L-shaped in cross section. A lower end of the blocking body 80 preferably is held in contact with the surface Wa of the workpiece W.

The blocking body 80 is made of a heat-resistant material such as a ceramic or the like, or is coated with a heat-resistant material. The opening 82 is defined as a slit, which extends from one end of the blocking body 80 toward the other end thereof that is connected to the joint bar 78. The opening 82 serves as an assistive gas releasing mechanism for discharging the assistive gas AG from the blocking body 80.

According to the third embodiment, the blocking body 80 of the sputter blocking jig 74 is mounted on the joint 72, and lies across directions in which the laser beam L is scattered. The opening 82, which is in the form of a slit defined in a side wall of the blocking body 80 that confronts the laser nozzle 30, extends through the blocking body 80 in an axial direction. The blocking body 80 provides a fluid passage for discharging the assistive gas AG along the opening 82, and is effective to prevent dross from becoming deposited on the workpiece W.

The laser machining apparatus 70 according to the third embodiment offers the same advantages as those of the first and second embodiments. More specifically, the laser machining apparatus 70 is capable of shortening the time required to form cooling holes 60 in the surface Wa of the workpiece W, and of suitably machining the workpiece W. Therefore, the laser machining apparatus 70 is capable of forming a plurality of high-quality cooling holes 60 efficiently in the workpiece W.

Figure 9:
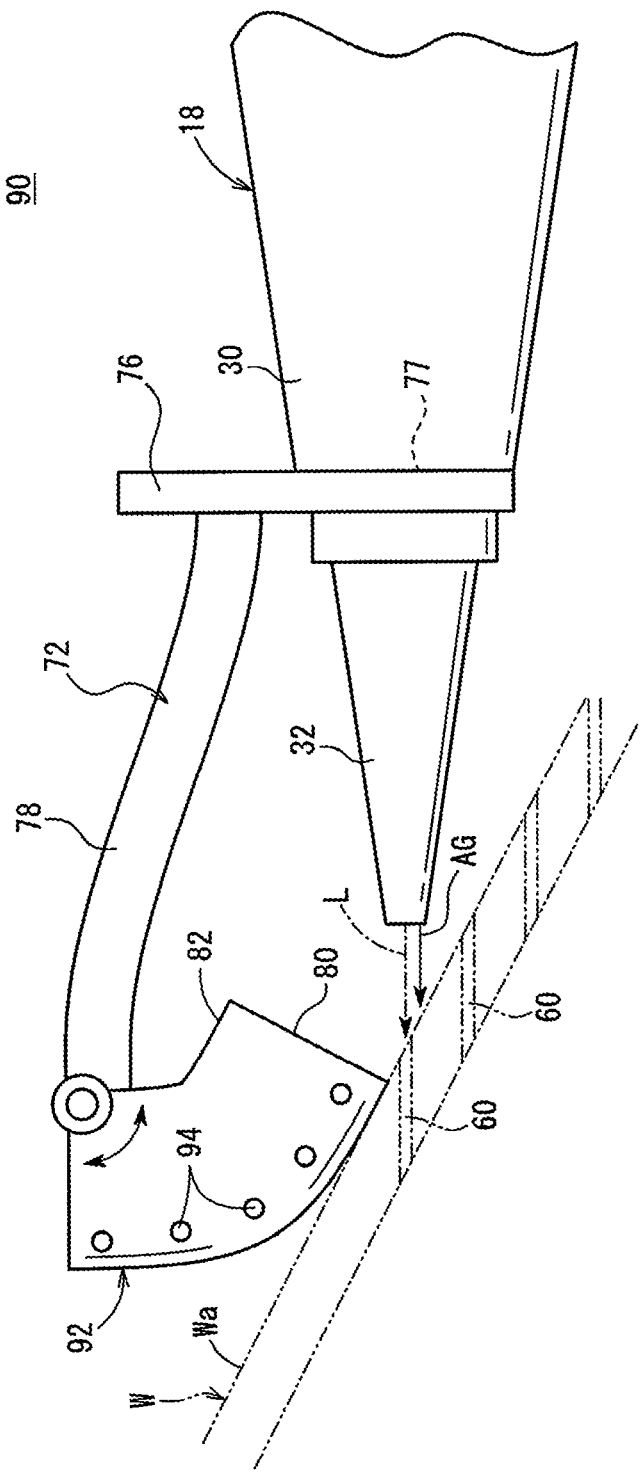
FIG. 9 is an elevational view of a central portion of a laser machining apparatus according to a fourth embodiment of the present invention.

FIG. 9 is an elevational view of a central portion of a laser machining apparatus 90 according to a fourth embodiment of the present invention. Components of the laser machining apparatus 90 according to the fourth embodiment, which are identical to those of the laser machining apparatus 70 according to the third embodiment, are denoted by identical reference characters, and such features will not be described in detail below.

As shown in FIG. 9, the laser machining apparatus 90 includes a sputter blocking jig 92 having a blocking body 80 with a plurality of discharge holes 94 defined in a side wall thereof. The discharge holes 94 preferably are inclined upwardly from a horizontal direction, for thereby discharging the assistive gas AG introduced into the blocking body 80 out of the blocking body 80.

The laser machining apparatus 90 according to the fourth embodiment offers the same advantages as those of the third embodiment, while additionally being capable of easily and reliably discharging the assistive gas AG out of the blocking body 80.

While the preferred embodiments of the present invention have been described above, it should be understood that the present invention is not limited to the illustrated embodiments, but various changes and modifications may be made to the embodiments without departing from the scope of the appended claims.

What is claimed is:

1. A laser machining apparatus, which applies a laser beam to a workpiece at an angle that is set to be inclined with respect to a surface of the workpiece, to thereby form an oblique hole in the surface, comprising:
    a laser nozzle for supplying an assistive gas to remove undesirable material produced by the applied laser beam, and applying the laser beam at the set angle with respect to the surface of the workpiece, either in a pulsed pattern or continuously for a predetermined period of time, wherein the set angle between a nozzle tip of the laser nozzle and the surface of the workpiece is limited to the range of 10° to 40°;
    a sputter blocking jig disposed over a region of the workpiece that is irradiated with the laser beam, so as to lie across directions in which the laser beam is scattered, and for blocking sputtered particles that are generated from the surface by the applied laser beam; and
    a joint detachably mounted to an outer wall of the laser nozzle and interconnecting the laser nozzle and the sputter blocking jig, the joint allowing the laser nozzle and the sputter blocking jig to move in synchronism with each other,
    wherein the sputter blocking jig includes a flow passage that opens along an axial direction of the sputter blocking jig and the assistive gas supplied by the laser nozzle flows through the flow passage, the sputter blocking jig comprises:
    a blocking body mounted on the joint so as to lie across directions in which the laser beam is scattered;
    wherein the blocking body takes a half-cylindrical shape including a first open end facing an outlet of the laser nozzle and a second open end spaced from the first open end in the axial direction,
    wherein the blocking body has an opening defined in a side wall thereof that extends through the blocking body in the axial direction, the opening faces upward away from the surface of the workpiece and confronts the outlet of the laser nozzle,
    wherein the opening extends from the first open end of the blocking body toward the second open end of the blocking body that is mounted to the joint,
    wherein the blocking body provides the flow passage for discharging the assistive pas supplied by the laser nozzle along the opening, wherein the opening defined in the side wall of the blocking body is open to the atmosphere, and the flow passage communicates with the atmosphere through the opening.

2. The laser machining apparatus according to claim 1, wherein the blocking body has a discharge hole defined therein for discharging the assistive gas out of the blocking body.

3. The laser machining apparatus according to claim 1, wherein the joint interconnects the outer wall of the laser nozzle and the side wall of the sputter blocking jig.

4. The laser machining apparatus according to claim 1, wherein the joint includes a bracket that is detachably mounted to the outer wall of the laser nozzle.

5. The laser machining apparatus according to claim 4, wherein the laser nozzle includes a nozzle body and a separate nozzle tip removably installed on the nozzle body, the bracket is positioned between the nozzle body and the nozzle tip.

6. The laser machining apparatus according to claim 1, wherein the blocking body is swingably mounted to the joint.

7. The laser machining apparatus according to claim 1, wherein the sputter blocking jig does not cover a site of the workpiece that is irradiated with the laser beam.

8. A laser machining apparatus, which applies a laser beam to a workpiece at an angle that is set to be inclined with respect to a surface of the workpiece, to thereby form an oblique hole in the surface, comprising:
  a laser nozzle for supplying an assistive gas to remove undesirable material produced by the applied laser beam, and applying the laser beam at the set angle with respect to the surface of the workpiece, either in a pulsed pattern or continuously for a predetermined period of time, wherein the set angle between a nozzle tip of the laser nozzle and the surface of the workpiece is limited to the range of 10° to 40°;
  a sputter blocking jig disposed away from a location where the laser beam is applied to the surface of the workpiece and over a region of the workpiece that is irradiated with the laser beam, so as to lie across directions in which the laser beam is scattered, and for blocking sputtered particles that are generated from the surface by the applied laser beam; and
  a joint interconnecting the laser nozzle and the sputter blocking jig, the joint allowing the laser nozzle and the sputter blocking jig to move in synchronism with each other,
  wherein the sputter blocking jig includes a flow passage that opens along an axial direction of the sputter blocking jig and the assistive gas supplied by the laser nozzle flows through the flow passage, the sputter blocking jig comprises:
  a blocking body swingably mounted on the joint so as to lie across directions in which the laser beam is scattered;
  wherein the blocking body takes a half-cylindrical shape including a first open end facing an outlet of the laser nozzle and a second open end spaced from the first open end in the axial direction,
  wherein the blocking body has an opening defined in a side wall thereof so that the opening penetrates the sputter blocking jig, the opening extends in the axial direction and faces upward away from the surface of the workpiece and confronts the outlet of the laser nozzle,
  wherein the opening extends from the first open end of the blocking body toward the second open end of the blocking body that is mounted to the joint,
  wherein the opening is open to the atmosphere, and the flow passage communicates with the atmosphere through the opening.

9. A laser machining apparatus, which applies a laser beam to a workpiece at an angle that is set to be inclined with respect to a surface of the workpiece, to thereby form an oblique hole in the surface, comprising:
  a laser nozzle for supplying an assistive gas to remove undesirable material produced by the applied laser beam, and applying the laser beam at the set angle with respect to the surface of the workpiece, either in a pulsed pattern or continuously for a predetermined period of time, wherein the set angle between a nozzle tip of the laser nozzle and the surface of the workpiece is limited to the range of 10° to 40°;
  a sputter blocking jig disposed away from a location where the laser beam is applied to the surface of the workpiece and over a region of the workpiece that is irradiated with the laser beam, so as to lie across directions in which the laser beam is scattered, and for blocking sputtered particles that are generated from the surface by the applied laser beam, wherein the sputter blocking jig does not cover a site of the workpiece that is irradiated with the laser beam; and
  a joint interconnecting the laser nozzle and the sputter blocking jig, the joint allowing the laser nozzle and the sputter blocking jig to move in synchronism with each other,
  wherein the sputter blocking jig comprises:
  a blocking body mounted on the joint so as to lie across directions in which the laser beam is scattered;
  wherein the blocking body is in the form of a hollow cylinder including a first open end facing an outlet of the laser nozzle and a second open end spaced from the first open end in the axial direction,
  wherein the blocking body has an opening defined in a side wall thereof so that the opening penetrates the sputter blocking jig, the opening extends in an axial direction of the blocking body and faces upward away from the surface of the workpiece and confronts an outlet of the laser nozzle, wherein the opening extends from the first open end of the blocking body toward the second open end of the blocking body that is mounted to the joint,
  wherein the blocking body provides a flow passage for discharging the assistive gas supplied by the laser nozzle along the opening,
  wherein the opening defined in the side wall of the blocking body is open to the atmosphere, and the flow passage communicates with the atmosphere through the opening.

10. The laser machining apparatus according to claim 8, wherein the blocking body is substantially L-shaped in both cross section and side view.

11. The laser machining apparatus according to claim 9, wherein the blocking body is substantially L-shaped in both cross section and side view.

* * * * *